United States Patent
Spesser

(10) Patent No.: US 10,611,265 B2
(45) Date of Patent: Apr. 7, 2020

(54) CHARGING PLUG FOR AN ELECTRICALLY DRIVEN VEHICLE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/272,676

(22) Filed: Feb. 11, 2019

(65) Prior Publication Data

US 2019/0168626 A1  Jun. 6, 2019

Related U.S. Application Data

(63) Continuation-in-part of application No. 15/006,248, filed on Jan. 26, 2016, now abandoned.

(30) Foreign Application Priority Data

Jan. 29, 2015 (DE) .................. 10 2015 101 284

(51) Int. Cl.
*B60L 53/16* (2019.01)
*H01R 13/66* (2006.01)
(Continued)

(52) U.S. Cl.
CPC ............. *B60L 53/16* (2019.02); *B60L 53/302* (2019.02); *G01K 1/14* (2013.01); *H01R 13/665* (2013.01);
(Continued)

(58) Field of Classification Search
None
See application file for complete search history.

(56) References Cited

U.S. PATENT DOCUMENTS 5,121,044 A * 6/1992 Goldman ............... H01M 4/02
320/109
8,016,607 B2   9/2011 Brown, II
(Continued)

FOREIGN PATENT DOCUMENTS

DE   102009045639 A1   4/2011
DE   102010062234 A1   7/2011
(Continued)

OTHER PUBLICATIONS

SAE J1772 Standard Rev. Nov. 2001, (Nov. 2001), pp. 8-9. (Year: 2001).*

(Continued)

*Primary Examiner* — David V Henze-Gongola
(74) *Attorney, Agent, or Firm* — Gerald E. Hespos; Michael J. Porco; Matthew T. Hespos

(57) ABSTRACT

A charging plug for an electrically driven vehicle has a feed line for electrically connecting the charging plug to a charging infrastructure. The charging plug includes power contacts, a signal contact, a rectifier, and a control and protection device. The power contacts and signal contact electrically connect the charging plug to the vehicle. The rectifier is connected to the feed line and to the power contacts for converting an alternating current obtained by the feed line into a direct current that is delivered by the power contacts to the vehicle in a charging process. The control and protection device is connected to the feed line, to the power contacts and to the signal contact for matching the charging process to the vehicle by means of the signal contact.

9 Claims, 2 Drawing Sheets

(51) Int. Cl.
*G01K 1/14* (2006.01)
*B60L 53/302* (2019.01)

(52) U.S. Cl.
CPC ...... *H01R 13/6658* (2013.01); *B60L 2210/30* (2013.01); *G01K 2205/00* (2013.01); *H01R 13/6666* (2013.01); *H01R 2201/26* (2013.01)

(56) References Cited

U.S. PATENT DOCUMENTS

| | | |
|---|---|---|
| 9,124,104 B2 | 9/2015 | Niemann |
| 9,174,592 B2 | 11/2015 | Takaka |
| 2009/0167537 A1* | 7/2009 | Feliss .................... B60L 3/0069 340/584 |
| 2010/0156355 A1* | 6/2010 | Bauerle .................. B60L 3/003 320/145 |
| 2011/0171850 A1* | 7/2011 | Brown, II ............ H01R 13/502 439/372 |
| 2012/0081073 A1 | 4/2012 | Niemann |
| 2013/0035815 A1* | 2/2013 | Ando .................... B60W 10/08 701/22 |
| 2013/0069590 A1 | 3/2013 | Niemann |
| 2013/0154362 A1 | 6/2013 | Takaka |
| 2013/0249522 A1 | 9/2013 | Satake |
| 2015/0303737 A1 | 10/2015 | Steinbuchel, IV |

FOREIGN PATENT DOCUMENTS

| | | |
|---|---|---|
| EP | 2615743 A1 | 7/2013 |
| EP | 2641782 A1 | 9/2013 |
| JP | 2012230851 A | 11/2012 |
| WO | 2014036013 A2 | 3/2014 |

OTHER PUBLICATIONS

SAE J1772 Standard Rev. Nov. 2001, (Nov. 2001), pp. 8-9, 11, 18 and 28-29.*
German Search Report dated Feb. 3, 2015.
Phoenix Contact, 2011.
SAE J1772 Standard Rev. Nov. 2001, (Nov. 2011), pp. 8-9. (Year: 2001).

* cited by examiner

CHARGING PLUG FOR AN ELECTRICALLY DRIVEN VEHICLE

CROSS REFERENCE TO RELATED APPLICATION

This application is a continuation-in-part application of U.S. application Ser. No. 15/006,248, filed Jan. 26, 2016, which claims priority under 35 USC 119 to German Patent Appl. No. 10 2015 101 284.7 filed on Jan. 29, 2015.

BACKGROUND

1. Field of the Invention

The invention relates to a charging plug for an electrically driven vehicle.

2. Description of the Related Art

Apparatuses for charging the traction battery of an electrically driven vehicle have long been known. The traction battery can be connected to the stationary alternating-current supply system that forms part of the public infrastructure by means of a vehicle-end charging device via a charging cable. To this end, the charging cable has a charging plug that can be plugged into a vehicle-end charging socket. The vehicle-end charging device comprises a rectifier, also called an AC/DC converter that sets the maximum possible charging current using a control and protection device (in-cable control and protection device, IC-CPD) in the form of a box in the cable.

DE 10 2009 045 639 A 1 relates to an electrical connecting apparatus comprising an output connection that is connectable in a detachable manner to a charging connection of a rechargeable battery device of a vehicle which is operated by current. The electrical connecting apparatus comprises a supply connection designed to be connected in a detachable manner to a supply system connection of an alternating-current low-voltage integrated supply system, and comprising an AC/DC converter that is suitable for converting the AC voltage of the supply connection into an electrical DC voltage suitable for the rechargeable battery apparatus.

DE 102010 062 234 A 1 discloses a plug arrangement with a housing that has an inlet for receiving an electrical cable harness and an outlet for engaging into a vehicle socket for electrically charging a vehicle. The housing comprises a large number of transversely running retaining ribs, a pivot point and a series of guides. The housing is designed to hold a distributed load. A locking mechanism comprising a lever, a connecting part and a tripping means is fit to the outside of the housing for selectively connecting the housing to the vehicle socket. The lever is connected to the pivot point in a pivotable manner, and the connecting part is coupled to the lever to pivot the lever. The tripping means is mounted in a displaceable manner and comprises openings dimensioned to receive the respective guides. The tripping means operates the connecting part. A shell is arranged over the housing to hold the locking mechanism and to allow the locking mechanism to be repaired and/or replaced without electronic components in the housing being exposed for this purpose.

EP 2 615 743 A 1, JP 2012-230851 A, WO 2014/036013 A2 and EP 2641 782 A1 propose similar arrangements.

SUMMARY

The invention provides a charging plug for an electrically driven vehicle. The charging plug of the present disclosure jointly integrates the vehicle-end charging device, in particular the vehicle-end AC/DC converter, and the monitoring and control device, which is usually in the form of a box in the cable (i.e., disposed at some point along the length of the cable), in the charging plug of the charging cable.

One advantage of this invention is that the vehicle-end charging device is dispensed with, thereby reducing the weight of the vehicle. The charging cable also is easier to handle by not arranging the monitoring and control device as a box in the charging cable, but instead, integrating the monitoring and control device in the charging plug coupled to the cable. Finally, the vehicle is provided with the charging energy via the charging plug, without further line losses, in the form of the direct current that is required for charging the traction battery.

Further advantageous refinements of the invention are specified in the dependent patent claims.

An exemplary embodiment of the invention is illustrated in the drawing and will be described in greater detail in the text that follows.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

Figure 1:
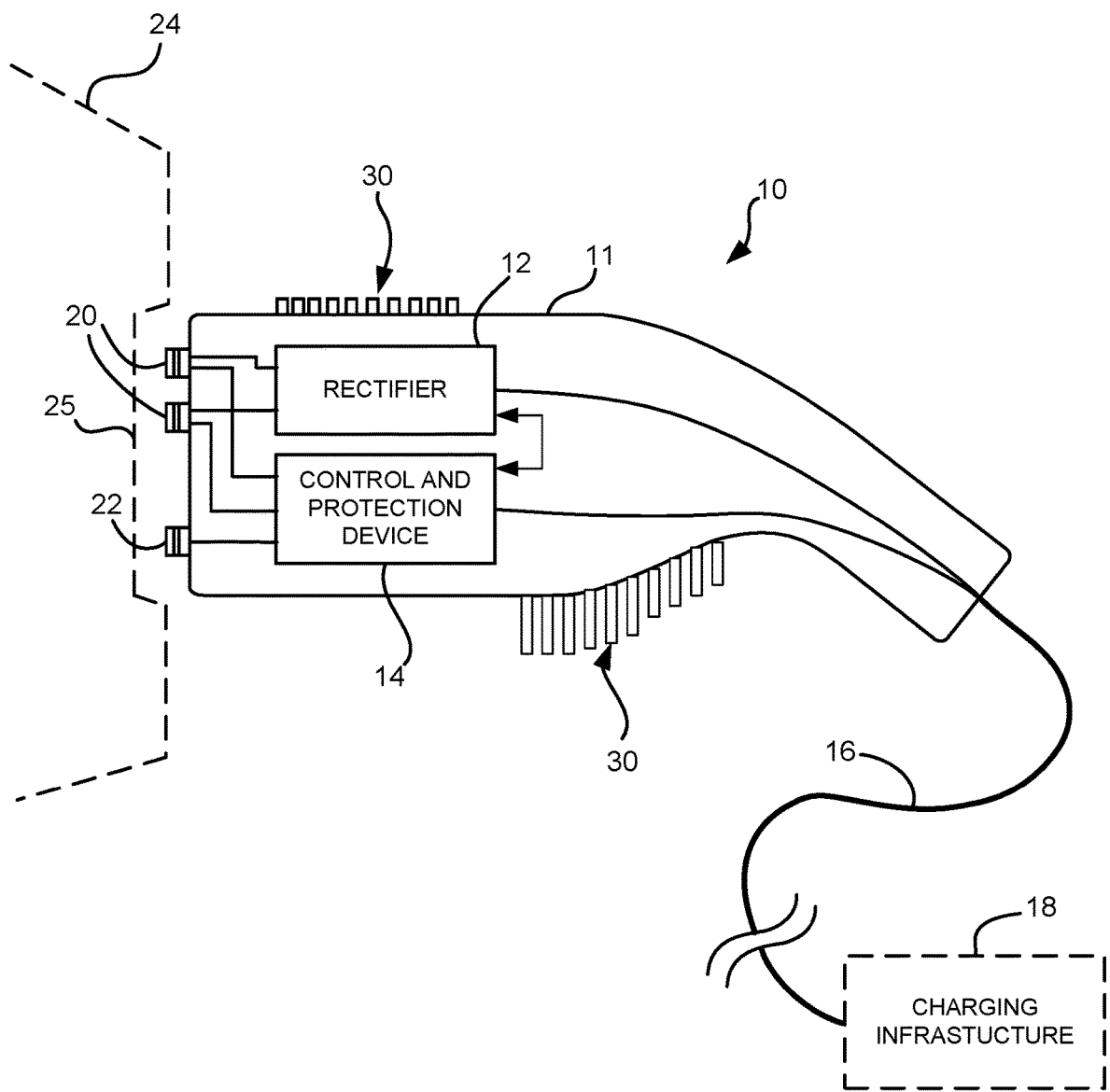
FIG. 1 is a block diagram of a charging plug according to an embodiment of the of the present disclosure.

FIG. 1 illustrates a charging plug 10 in accordance with the present disclosure. The charging plug includes a housing 11 configured as a handle to be gripped by a user to maneuver charging plug 10 as desired. Housing 11 integrates a rectifier 12 and a control and protection device 14. It is to be appreciated that the rectifier 12 is configured as an AC/DC converter that would normally be found in an electric vehicle and the control and protection device 14 is configured as a control and protection device that would normally be found in a charging cable, e.g., disposed a predetermined distance from the housing 11. The charging plug 10 further includes one or more power contacts 20 and a signal contact 22. When charging plug 10 is received by a charging socket 25 of vehicle 24, contacts 20, 22 are configured to electrically connect charging plug 10 to the vehicle 24. Contacts 20 are coupled to rectifier 12 and the control and protection device 14 and signal contact 22 is also coupled to control and protection device 14. Rectifier 12 and control and protection device 14 are each coupled to feed line or cable 16, where feed line 16 connects the charging plug 10 electrically to the charging infrastructure 18. Rectifier 12 and control and protection device 14 are each coupled to each other where, for example, control and protection device 14 sends control signals to rectifier 12, rectifier 12 may send sensed parameters to control and protection device 14, etc.

Figure 2:
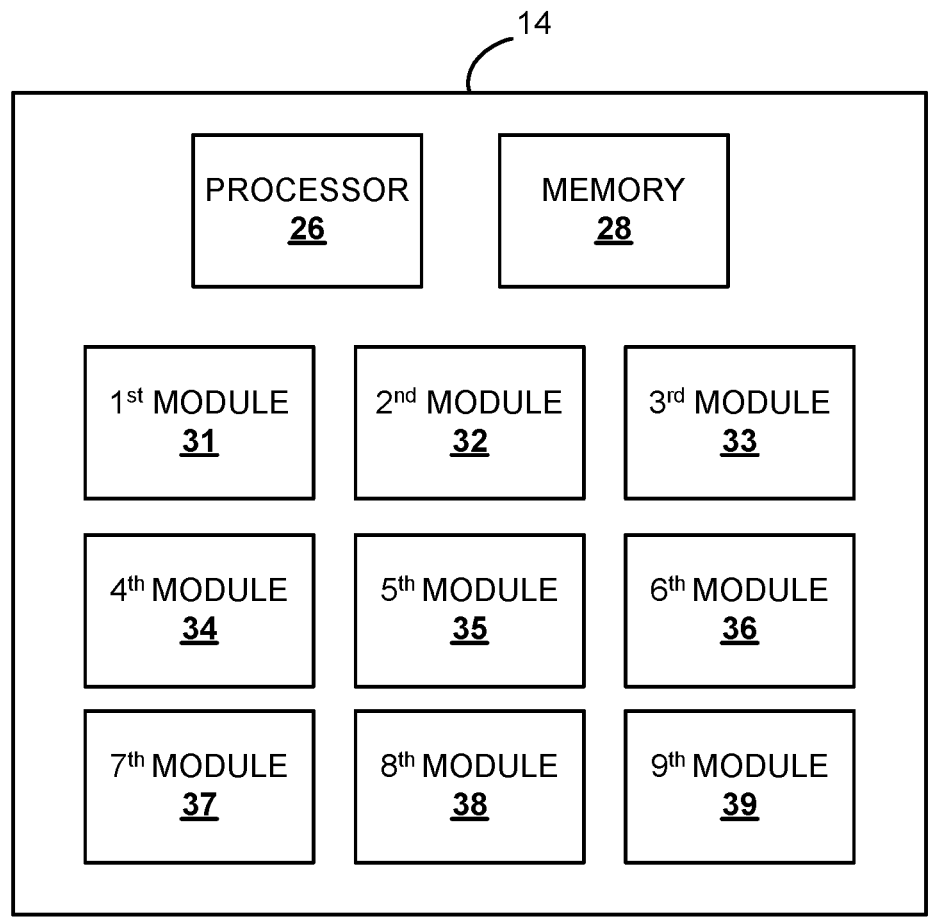
FIG. 2 is a block diagram of a control and protection unit of the charging plug of FIG. 1 according to an embodiment of the present disclosure.

Referring to FIG. 2, control and protection device 14 may include at least one processor 26 and at least one memory device 28. The functions of the control and protection unit 14 shown in FIGS. 1 and 2 may be provided through the use of dedicated hardware as well as hardware capable of executing software in association with appropriate software. In one embodiment, some or all of the functions may be performed by at least one processor 26, such as a computer or an electronic data processor, digital signal processor or embedded micro-controller, in accordance with code, such as computer program code, software, and/or integrated circuits that are coded to perform such functions, unless indicated otherwise. When provided by a processor 26, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the control and protection unit 14, such as a memory 28, input/output interfaces, a wireless transceiver, analog-to-digital converters, etc.

In one embodiment, control and protection device 14 includes several modules 31, 32, 33, 34, 35, 36, 37, 38, 39. One or more of modules 31-39 may be implemented as software that is stored in memory 28 and executed by processor 26. Furthermore, one or more of modules 31-39 may be implemented as hardware that is in communication with and/or controlled by processor 26. For example, one or more of modules 31-39 may be a sensor for detecting temperature, current, voltage, or any other desired property or characteristic.

Referring again to FIG. 1, as part of the charging process, when charging plug 10 is coupled to charging socket 25 of vehicle 24, the alternating current that is obtained by the feed line 16 via the charging infrastructure 18 is converted into direct current by the highly integrated electronics of the rectifier 12 and delivered to the vehicle 24 by the power contacts 20. Processor 26 of control and protection device 14 is configured to communicate with vehicle 24 via signal control 22 to determine one or more properties or characteristics associated with vehicle 24. Based on the determined properties or characteristics associated with vehicle 24, processor 26 selectively controls rectifier 12 to match the charging process to the vehicle 24. For example, the properties or characteristics associated with vehicle 24 may include, but are not limited to, information relating to the traction battery of vehicle 24, information relating to charging settings of vehicle 24 (e.g., stored in a memory of vehicle 24), the make/model of vehicle 24, etc.

During the charging process, processor 26 and modules 31-39 fulfill a range of software and hardware functions, each of which will be described in greater detail below.

A first module 31 is configured for evaluating the integral of the previous charging powers or services. The first module 31 may be software stored on memory 28 and executed by processor 26. Alternatively, the first module 31 may be a dedicated processor for evaluating the integral of previous charging powers. Based on the integral, processor 26 is configured to control rectifier 12 to adjust the power provided by rectifier 12 to socket 25.

A second module 32 is configured for evaluating the coolant temperature of the vehicle 24, e.g. an engine coolant temperature, battery coolant temperature, etc. The second module may be software stored in memory 28 and executed by processor 26 or a dedicated processor that queries vehicle 24 for the coolant temperature. In one embodiment, the second module queries the vehicle and determines (based on a response to the query) if the coolant temperature is within a range of an adjustable, predetermined setpoint. Based on this determination, the result may be transmitted to the processor 26, which in turn controls rectifier 12 to adjust the power provided to socket 25 via contacts 20.

A third module 33 is configured for evaluating the energy throughput at contacts 20. The third module 33 may be a current, voltage, and/or energy sensor configured to sense throughput energy. The sensed throughput energy is provided to processor 26, which in turn controls rectifier 12 to adjust the power provided to socket 25 based on an adjustable predetermined setpoint.

A fourth module 34 is configured for detecting the outside temperature. The fourth module 34 may be a sensor included in control and protection unit 14 configured to sense the temperature outside of housing 11. The outside temperature may be used by processor 26 to adjust the power provided to socket 25 by rectifier 12 to compensate in changes to resistance, conductivity, etc. affected by the outside temperature.

A fifth module 35 is configured for detecting the internal device (e.g., of vehicle 24 and/or plug 10) temperatures. The fifth module 35 may be a processor configured to query temperature sensors coupled various components of vehicle 24 and/or plug 10. The fifth module 35 may include a sensor included in control and protection unit 14 configured to sense the temperature of one or more components inside of housing 11. In one embodiment, the detected internal device temperatures may be transmitted to the processor 26 by module 35. Based on the received temperatures, processor 26 controls rectifier 12 to adjust the power provided by rectifier 12 to socket 25. For example, in one embodiment, processor 26 may reduce the output power or turn off output power of rectifier 12 if the detected internal device temperature exceeds an adjustable predetermined setpoint.

A sixth module 36 is configured for detecting and evaluating the existing power of the respective power paths. Based on the evaluation, processor 26 may controls rectifier 12 to adjust the power provided by rectifier 12 to socket 25.

A seventh module 37 is configured for detecting the existing current and voltage loadings of all semiconductors and transformers. The seventh module 37 may include a processor for querying one or more sensors or controllers for the current and voltage of all semiconductors and transformers in plug 10 and/or vehicle 24. The seventh module 37 may include a current and/or voltage sensor configured to sense current and voltage in the components of rectifier circuit 12. The sensed and/or queried voltages and currents are provided to processor 26. In one embodiment, based on the voltages and currents received, processor 26 controls rectifier 12 to adjust the output power provided to socket 25. For example, in one embodiment, processor 26 controls rectifier 12 to reduce the output power or turn off output power if the sensed voltages and currents exceed corresponding adjustable predetermined setpoints.

An eighth module 38 is configured as an interface for the charging management system for outputting and/or receiving information to/from a user, e.g., for a power increase recommendation. The eight module 38 may include a processor or software executable by processor 26 configured to generate a graphical user interface and/or process outputs/inputs to/from a hardware interface for the charging management system. In one embodiment, the interface of module 38 includes hardware (e.g., buttons, controls, touchscreen, etc.) and is disposed on a surface of the handle 11, enabling a user to respond to the power increase recommendation and/or enter setpoints. In another embodiment, the charging management system is part of the charging infrastructure 18 and the eighth module 38 generates a graphical interface to be displayed on a display device of the charging infrastructure 18.

A ninth module 39 is configured for the charging process (CP) preparation. The ninth module 39 may be a processor or software executable on processor 26 that conducts the CP preparation for charging vehicle 24 using plug 10 based on data received from one or more of processor 26 and/or modules 31-38. It is to be appreciated that control of the rectifier 12 may be based on information received from one module, a combination of select modules, a subset of the modules, all of the modules or any combination thereof.

In one embodiment, handle 11 is configured in an ergonomic shape for facilitating easy use by the user and in an aesthetically pleasing shape. In another embodiment, the handle 11 includes a plurality of cooling ribs 30 disposed through an outer wall or surface of handle 11. The cooling ribs 30 are configured to draw heat away from the internal components of plug 10, e.g., the rectifier 12 and/or control and protection device 14, and enable the drawn-out heat to dissipate awat from plug 10. It is to be appreated that the ribs 30 may be disposed on any one surface of the housing 11, e.g., a surface that is in close proximity to the rectifier 12, or on a plurality of different surfaces of the housing 11.

What is claimed is:

1. A charging plug for charging an electrically driven vehicle, the charging plug configured to be electrically connected to a charging infrastructure via a feed line, the charging plug comprising:
    power contacts and a signal contact for electrically connecting the charging plug to the vehicle;
    a rectifier connected to the feed line and to the power contacts, the rectifier converts an alternating current that is provided by the feed line into a direct current that is delivered to the vehicle by the power contacts in a charging process;
    a control and protection device simultaneously connected to the feed line, to the power contacts, and to the signal contact, the control and protection device configured to communicate with the vehicle via the signal contact, wherein, based on the communication with the vehicle, the control and protection device selectively controls the rectifier to match a charging process to the vehicle,
    a first module for evaluating an energy throughout at the power contacts of the charging plug, wherein, based on the energy throughout, the control and protection device is configured to control the rectifier to adjust the power provided to the vehicle via the power contacts; and
    a handle including an interior, wherein the rectifier and control and protection device are each disposed in the interior of the handle.

2. The charging plug of claim 1, further comprising a second module for evaluating an integral of a previous charging power, wherein, based on the evaluated integral, the control and protection device is configured to control the rectifier to adjust the power provided to the vehicle via the power contacts.

3. The charging plug of claim 2, further comprising a third module for evaluating a coolant temperature, wherein, based on the coolant temperature, the control and protection device is configured to control the rectifier to adjust the power provided to the vehicle via the power contacts.

4. The charging plug of claim 3, further comprising a fourth module for detecting a temperature outside the charging plug, wherein, based on the temperature outside the charging plug, the control and protection device is configured to control the rectifier to adjust the power provided to the vehicle via the power contacts.

5. The charging plug of claim 4, further comprising a fifth module for detecting a temperature inside the charging plug, wherein, based on the temperature inside the charging plug, the control and protection device is configured to control the rectifier to adjust the power provided to the vehicle via the power contacts.

6. The charging plug of claim 5, further comprising a sixth module for detecting and evaluating power of an electrical path within the charging plug, wherein, based on evaluated power of the electrical path, the control and protection device is configured to control the rectifier to adjust the power provided to the vehicle via the power contacts.

7. The charging plug of claim 6, further comprising a seventh module for detecting an existing current or voltage loading of semiconductors and transformers of the charging plug, wherein, based on the existing current or voltage loading of the semiconductors and transformers of the charging plug, the control and protection device is configured to control the rectifier to adjust the power provided to the vehicle via the power contacts.

8. The charging plug of claim 7, further comprising an eighth module for outputting a power increase recommendation to a charging management system of the charging infrastructure.

9. The charging plug of claim 8, further comprising a ninth module for preparing control data for the signal contact.

* * * * *